Patented Apr. 27, 1954

UNITED STATES PATENT OFFICE 2,676,930

POLYBUTADIENE LATEX EMULSION PAINTS

John F. McKay, Jr., Cranford, and Sidney F. Williams, Jr., Middletown Township, Monmouth County, N. J., assignors to Standard Oil Development Company, a corporation of Delaware No Drawing. Application April 29, 1952, Serial No. 285,066

4 Claims. (Cl. 260—8)

This invention relates to an improvement in high polymer latices. In particular, this invention relates to the production of rubbery to resinous butadiene homopolymer latices suitable for use as an emulsion paint base, that is, to latices having low viscosity at high solids content, high resistance to chemical and mechanical coagulating effects, and good film forming properties.

The preparation of rubber-like and resinous diolefin polymers and copolymers in emulsion form has been practiced commercially for considerably more than a decade. However, the latices resulting from such conventional polymerization processes generally tended to have a high viscosity at high solids contents, which precluded their use in paper coating, emulsion paint compositions, and the like. Moreover, the prior art latices in general have been deficient in certain respects, particularly for emulsion paints, e. g., insufficient stability to permit loading with pigments to the extent required in coating compositions and insufficient bodying. Many formulae suitable for preparing latices of butadiene-styrene copolymers, for example, will not result in acceptable emulsion paints when the copolymer is replaced by polybutadiene because the resulting films are too soft and rubbery for acceptance.

An important feature of the present invention is to prepare a synthetic polybutadiene latex paint composition having controlled bodying characteristics within certain particular limits. A suitable bodying test is to measure the Ford cup viscosity, which for purposes of the present invention should be about 40 to 80, preferably about 60 to 70 seconds at 77° F. (25° C.). The constituents of the latex paint composition of this invention cooperate, in some manner not yet understood, to produce compositions having these desired bodying characteristics, whereas prior art products made with somewhat similar but slightly different formulations, gave unsatisfactorily low viscosities in the range of 10 to 20.

It has now been discovered that synthetic latices of improved characteristics for use in paint compositions can be readily synthesized from polybutadiene when a certain special combination of ingredients is used. This combination is (1) use of emulsifiable metallic driers, (2) substitution of kaolin for the mica of the usual formulae, (3) complete elimination of casein from the formula, and (4) use of methyl cellulose as a thickener. Films produced from such latices have all the desirable properties of films produced from butadiene-styrene latices and are hard, color-stable to ultra-violet and sunlight, are non-brittle and have superior adhesion and stain and scrub resistance. Hiding power, leveling and sheen are equivalent to commercial emulsion paints made from a 60% styrene-40% butadiene copolymer latex. Furthermore, the resulting formulations incorporate less titanium dioxide than do conventional emulsion paint formulations to produce surface coatings with the desired degree of sheen.

The basic concept of the present invention is applicable to the preparation of high molecular weight, rubber-like to resinous homopolymers of conjugated diolefins of 4 to 6 carbon atoms such as butadiene, isoprene or 2,3-dimethylbutadiene-1,3.

In a manner conventional in emulsion polymerization, 1 part of the monomer is emulsified in 0.5 to 3 parts by weight of an aqueous medium, the preferred weight ration being 1 part of monomers per 1 to 1.5 parts of water. The emulsifiers used may include any type known to the art, but particularly effective types are the ionic organic emulsifiers such as sodium isobutylnaphthalene sulfonate, sodium oleate, etc., together with an electrolyte such as sodium sulfate as taught in Serial No. 179,648, filed August 15, 1950. A particular suitable type is a mixture of ionic and non-ionic emulsifiers. The alkali metal resinate emulsifiers, such as the sodium or potassium soap of rosin acids at taught by Serial No. 236,698, filed July 13, 1951, now Patent No. 2,605,242, are also very suitable.

The emulsified reaction mixture also contains about 0.1 to 3 weight per cent, or preferably 0.2 to 0.5 weight per cent (based on monomers) of a per-type or oxidizing catalyst exemplified by persulfates or perborates of sodium, potassium or of ammonium. For economical reasons, potassium persulfate is used most commonly. Alternatively, peroxides such as hydrogen peroxide, benzoyl peroxide, cumene hydroperoxide, di-ter-butyl peroxide or hydroperoxide can be used also. The system may also be activated by auxiliary reducing agents such as dextrose commonly used in polymerizations based on recipes of the so-called redox type.

Finally, it is also desirable to have present in the reaction mixture a polymerization modifier such as an aliphatic mercaptan having six or preferably eight to eighteen carbon atoms per molecule, e. g. dodecyl mercaptan, tri-isobutylene mercaptan, or Lorol mercaptan, which is a mixture of primary $C_{10}$ to $C_{18}$ mercaptans derived from cocoanut oil and containing a predominant proportion of lauryl mercaptan. Other mercaptans such as n-hexyl, t-octyl, n-octadecyl are also useful.

Alternatively, known modifiers such as diisopropyl xanthogen disulfide, carbon disulfide, carbon tetrachloride, and the like can be used likewise. The amount of modifier used is preferably between about 0.2–2%, the principal object thereof being to maintain the Mooney viscosity of the polymeric product, after coagulation and drying, in the range of about 40 to 200. The specific optimum proportions of all the various ingredients of the reaction mixture depend on several factors such as type and proportion of the monomer, modifier, water ratio and reaction temperature as is well known to persons skilled in the art.

The reaction mixture is agitated within a closed reactor maintained at temperatures of 0° C. to 100° C., preferably 40 to 85° C., until 50% or preferably 90 to 100% conversion of monomers is obtained. Substantially complete conversion of monomers is desirable as it greatly facilitates economic operation in avoiding complications otherwise arising from monomer recovery and recycling. Depending on the particular combinations of ingredients and conditions employed, the required reaction time may range from about 5 to 60 hours, preferably about 12 to 24 hours.

Buffers may be added to hold pH at a desired level, for example, 0.2 to 1.0 part per 100 parts of monomers of sodium bicarbonate can be used. Activators may be used to accelerate reaction, for example, a mixture prepared by heating the potassium persulfate catalyst with potassium ferricyanide. For instance, 160 cc. of 6 per cent $K_2S_2O_8$ solution are mixed with 40 cc. of 6 per cent $K_3Fe(CN)_6$ and heated 2 hours at 122° F. This solution is used in an amount corresponding to 0.475 part $K_2S_2O_8$ and 0.12 part $K_3Fe(CN)_6$ per 100 parts of monomers.

Crosslinking agents, for example, 0.1 to 1.0 per cent of divinyl benzene (based on monomers), may be used to give harder, more resinous polymers.

At the end of the polymerization the reactor is vented. It is not necessary to add a short-stopping agent or antioxidant, but, if desired, agents such as hydroquinone, phenyl betanaphthylamine, ditertiary butyl cresol, 2,2-diphenylolpropane, hydroxylamine hydrochloride, and/or other customary ingredients may then be added to the latex. Where conversion is incomplete, stripping to remove residual monomer is desirable to improve odor and make the latex more suitable for use in emulsion paints. Before stripping, it is desirable to adjust latex pH to 9-11 to minimize coagulation during stripping.

The real essence of the invention lies in the discovery that certain ingredients must be included in the paint formula.

The first of these necessary ingredients is an emulsifiable metallic drier. Polybutadiene emulsion paints will not harden fast enough to be commercially attractive without the use of such metallic driers. However, when the driers of this invention are used, films made from the polybutadiene latex paint are harder after one week than commercial butadiene-styrene latex paint films. This result is unexpected and could not be predicted from the prior art because metallic driers are ineffective in promoting cures of conventional paint and varnish films if the pH of the paint or varnish is over 7. Suitable emulsifiable metallic driers include the naphthenates and octoates of metals such as cobalt, manganese and lead or combinations thereof.

The second of the necessary ingredients is kaolin which is substituted for the mica normally used as a pigment extender in commercial butadiene-styrene latex emulsion paints. Mica does not render the polybutadiene emulsion paints sufficiently stable with respect to viscosity.

The third of the necessary ingredients is methyl cellulose which is used as a substitute for a portion of the usual soybean protective colloid.

One of the functions of the protective colloid is to prevent paint instability due to coagulation of the emulsified polymer in the paint. Another function of the protective colloid is to give increased viscosity to the emulsion paint so that it will have "body" when applied by a paint brush or roller coater. In the past, such materials as casein or starch were used at high concentrations in water paints, but these, being very water soluble, resulted in paint films with poor washability characteristics. Early commercial emulsion paints such as Kem-Tone were formulated with such systems. More recently, it was found that soybean protein is effective as a protective colloid in latex emulsion paint systems and gives hard paint films with excellent scrub resistance.

However, it was found that when soybean protein was used as the protective colloid in emulsion paints made from polybutadiene latices, the resultant paints were of too thin a consistency to be acceptable for brush application. Increasing the concentration of the protein in the formulation is ineffective for increasing the "body" of the paint. However, when a portion of the protein is replaced by methyl cellulose, the viscosities of the polybutadiene latex emulsion paints are increased to a desirable level. Polybutadiene emulsion paints containing small amounts of methyl cellulose are completely stable during during shelf or high temperature aging. This is an unexpected advantage since if large amounts of methyl cellulose are used or if all of the soybean protein is replaced by methyl cellulose, paint instability results and the paint soon turns to paste in the can. The desired amount of methyl cellulose in aqueous solution may be blended homogeneously and easily with the polybutadiene emulsion paint by simply stirring to give the desired viscosity.

In this connection, casein and starch cannot be used as protective colloids for polybutadiene emulsion latex paints as their use results in unstable systems and paint films with poor washability.

In accordance with the above, the following is a formulation in accordance with the present invention:

| | Weight per cent |
|---|---|
| Polybutadiene latex | 35–60 (pref. 35–40). |
| Titanium dioxide, LW (pigment) | 15–25 (pref. 17–20). |
| Lithopone (pigment extender) | 5–15 (pref. 8–12). |
| Kaolin | 1–3 (pref. 1.5–2.5). |
| Tetrasodium pyrophosphate | 0.1–0.2 (pref. .1–.15). |
| Alpha protein | 1–3 (pref. 1.8–2.4). |
| Methyl cellulose (100 cp.) | .15–.25 (pref. .18–.22). |
| Ammonium hydroxide (26 Bé.) | .1–.3 (pref. .15–.2). |
| Sodium pentachlorophenate | .3–.4 (pref. .3–.35). |
| Pine oil | .3–.5 (pref. .35–.45). |
| Emulsifiable metallic drier | 0.01–0.03 (pref. .02). |
| Water | Sufficient to give a total solids content of 35 to 60% (pref. 45–55%). |

In the above formulation, LW titanium dioxide is used because of its minimum content of water reactive salts. The high amount of lithopone relative to titanium dioxide as compared with conventional semi-gloss emulsion paint formulations has been found to give improved hardness to paint films. Kaolin is used instead of mica (as specified in conventional emulsion paint formulations) because it gives improved viscosity stability to the polybutadiene latex emulsion paint of this invention. Tetrasodium pyrophosphate is added as a sequestering agent to prevent pigment flocculation and to promote latex stability. Alpha protein is used to serve as a protective colloid to stabilize the latex. Casein and starch, normally considered to be satisfactory protective colloids for emulsion paints, do not work with polybutadiene latex emulsion paints and result in unstable systems and paint films with poor washability. Ammonia is used as a solubilizer for the alpha protein. The small amount of methocel is added as a thickening agent to give the emulsion paint the desired viscosity. Sodium pentachlorophenate is added as a preservative. Pine oil is used as an anti-foam agent and to mask the odor of the protective colloid. The solids content of the latex used is generally 40–46%, but may vary widely. In any case, the higher the latex solids content of the final paint, the higher the gloss. The emulsifiable metallic drier must be included in the formulation to help give the desired hardness to the paint films. The coagulated polymer of the latex used should have a Mooney viscosity of above 80.

The invention is further illustrated by the examples described below. In these examples, as in all other portions of this specification, every reference to quantities in terms of "parts" shall be understood as meaning "parts by weight" unless the context indicates otherwise.

EXAMPLE 1

Three hundred grams of butadiene were charged to 2-liter stainless steel pressure bottles along with other ingredients for emulsion polymerization. The bottles were strapped in a radial position to a wheel rotating at 19 R. P. M. in a bath which was maintained at 60° C. for 40 hours. The following synthesis recipe was used.

450 ml. aq. Triton X100* (4%) and sodium oleate (1%)
300 g. butadiene
1 g. $K_2S_2O_8$
4 g. $Na_2SO_4$
2 ml. $C_{12}$ branched mercaptan (3B mercaptan)
1 ml. dodecyl mercaptan

* A commercial alkylated aryl polyether alcohol.

The butadiene polymer, when coagulated from the latex, washed and dried, had a Mooney plasticity value of 81. The latex had a non-volatile content of 43% and a pH of 9.0.

An emulsion paint was then prepared from this latex as follows: 66 grams of alpha protein (a fraction recovered from the crude soybean protein) were mixed with 5.4 grams of ammonia, 16.2 grams of sodium pentachlorophenate and 590.4 grams of water and stirred on a hot plate until solution was effected. A pigment dispersion was then prepared by wetting 578.7 grams of LW titanium dioxide, 314 grams of lithopone and 69 grams of kaolin with 150 grams of a 3% aqueous solution of tetrasodium pyrophosphate and 430 grams of the alpha protein solution. This was mixed by passing twice through a three-roll paint mill. The balance of the alpha protein solution (242 grams), 1203 grams of the latex, 13.2 grams of pine oil, 120 grams of 4% methyl cellulose solution and 20 ml. of emulsifiable cobalt drier (2% cobalt metal) were added to the mix by stirring. The paint was strained through cheesecloth and canned. A very stable, brushable product resulted having the following formulation:

*Polybutadiene latex emulsion paint recipe*

| Material | Wt. percent |
|---|---|
| Titanium dioxide (LW) | 18.58 |
| Lithopone | 10.05 |
| Kaolin (ASP 400) | 2.21 |
| Tetrasodium pyrophosphate | 0.14 |
| Alpha protein (Glidden) | 2.12 |
| Methocel (100 cp.) | 0.19 |
| Ammonia | 0.17 |
| Sodium pentachlorophenate | 0.33 |
| Pine Oil | 0.42 |
| Polybutadiene Latex (43% solids) | 38.50 |
| Water | 27.27 |
| Emulsifiable metallic drier (as metal) | 0.02 |
| | 100.00 |

Wt. percent solids=50.66.
Wt. ratio:pigment/binder=3/2.

The above formula was evaluated and compared with a commercial emulsion paint prepared from butadiene-styrene copolymer latex and known as Spred-Satin. The results are reported in Table I:

*Table I.—Evaluation of emulsion paints*

| Emulsion Paint | pH | Viscosity of Paint (Krebs) | | | | Gloss | Color Stability (Tristimulus Colorimetry) [8] | | | | | | | Brittleness [1] (140° F., Aging) | |
|---|---|---|---|---|---|---|---|---|---|---|---|---|---|---|---|
| | | Init. | 2 Days | 7 Days | 140° F. | | | Fadeometer | | | | Sunlight Aging | | | |
| | | | | | 2 Days | 7 Days | | Init. | 22 Hrs. Exposed | 22 Hrs. Unexposed | 44 Hrs. Exposed | 44 Hrs. Unexposed | Init. | 7 Days Exposed | 2 Days | 7 Days |
| Polybutadiene latex emulsion paint | 8.5 | 61 | 61 | 61 | 60 | 59 | 2.85 | +.005 | +.148 | +.152 | +.025 | +.050 | +.020 | +.048 | ⅛ | ⅛ |
| Spred Satin | 8.55 | 60 | 60 | 60 | 60 | 59 | 2.85 | +.007 | +.173 | +.164 | +.058 | +.054 | +.035 | +.051 | ⅛ | ⅛ |

| Emulsion Paint | Hardness | | | | | | | Staining [4] | | | | | | | |
|---|---|---|---|---|---|---|---|---|---|---|---|---|---|---|---|
| | Fingernail [2] | | | Adherometer (×10 [5] dynes) | | | | 2 Days [5] | | | | 7 Days [6] | | | |
| | 2 Days | 4 Days | 7 Days | 2 Days | 4 Days | 7 Days | Washability [3] | Ink | Lead Pencil | Lipstick | Wax Crayon | Ink | Lead Pencil | Tinct. Merthiolate | Lipstick | Wax Crayon |
| Polybutadiene latex emulsion paint | 7 | 4 | 1 | 6.37 | 9.14 | 21.60 | 50,000/mil | 1 | 0 | 0 | 0 | 3 | 0 | 0 | 0 | 0 |
| Spred Satin | 6 | 3 | 2 | 10.95 | 13.35 | 13.75 | [7] 37,500/mil | 3 | 0 | 0 | 2 | 0 | 0 | 2 | 0 | 0 |

NOTES.—Hiding power and leveling of polybutadiene latex emulsion paint are equal to Spred Satin.
[1] Shows no cracking when bent over ⅛" rod.
[2] Rated as 0 for maximum hardness 9 as very soft.
[3] Number of scrubs necessary to remove 1 mil of paint with 1 lb. brush 0.5% soap solution. Panels aged 6 days at RT plus 1 day at 140° F.
[4] Rated 0=no stain, 1 to 3 slight stain, 4 to 6 stained, 7 to 9 badly stained.
[5] Stains allowed to remain on panel 18 hours.
[6] Stains allowed to remain on panel 8 hours.
[7] Films lifted from panel when scrubbed to remove stains at 2 days.
[8] Measured on Hunter reflectometer using amber, blue and green filter. $\frac{\text{Amber-Blue}}{\text{Green}}$ is a measure of the yellowness of a film, with higher positive values indicating more yellowness.

EXAMPLE 2

A latex was made as in Example 1 and formulated into an emulsion paint using the following recipe:

| Ingredient | Wt. percent |
| --- | --- |
| Titanium Dioxide (LW) | 19.29 |
| Lithopone | 10.47 |
| Kaolin (ASP 400) | 2.30 |
| 3% Solution Tetrasodium Pyrophosphate | 5.00 |
| Alpha Protein | 2.20 |
| Ammonia | .18 |
| Sodium Pentachlorophenate | .34 |
| Pine Oil | .55 |
| Polybutadiene Latex (40% Solids) | 40.10 |
| Water | 19.68 |
|  | 100.00 |

This paint had a pH of 8.9.

Test panels were coated with the above emulsion paint and evaluated for hardness after 2 days', 1 week's and 2 weeks' air drying.

To a portion of the above paint was added with stirring 0.10% manganese naphthenate and 0.05% cobalt naphthenate, with concentrations expressed as the metal based on the polybutadiene solids in the paint. Test panels were coated and evaluated for hardness after 2 days', 1 week's, and 2 weeks' air drying. Test panels coated with Spred Satin were included for comparative purposes. Data are given in the following table:

Table II

|  | Naphthenate Driers | pH | Hardness[1] After R. T. Aging ($\times 10^5$ dynes) | | |
| --- | --- | --- | --- | --- | --- |
|  |  |  | 2 Days | 1 Week | 2 Weeks |
| Control | None | 8.9 | 2.36 | 3.51 | 4.78 |
| With driers | 0.10% Mn[2]  0.05% Co | 8.9 | 4.55 | 12.08 | 22.35 |
| Spred Satin |  | 8.6 | 9.26 | 9.55 | 10.12 |

[1] Measured with the Interchemical Adherometer. This instrument makes a 4 mm. cut with an ivory chisel using a mechanical drive. The force required to make the cut is indicated. Corrections for the force required to move the chisel over an unpainted surface and for film thicknesses are made, and results are expressed as stripping force in dynes per unit thickness of paint film. Adherence of emulsion paints to metal surfaces is so low that this factor may be ignored.
[2] As metal based on latex solids.

Example 3 is given to illustrate the invention with respect to unpigmented latex films.

EXAMPLE 3

A latex was made as in Example 1. The pH of the latex (40% solids) was 10.0. An unpigmented film of this latex was cast on a glass plate and allowed to dry for 18 hours. The film was very tacky and sticky.

To a portion of the above polybutadiene latex was added 0.4% lead, 0.04% manganese and 0.04% cobalt naphthenate driers (concentration expressed as weight per cent metal based on latex solids). A film was cast on glass and allowed to dry for 18 hours. This film was tack-free and hard.

EXAMPLE 4

A series of emulsion paints were formulated from polybutadiene latices using as the protective colloid alpha protein alone, methyl cellulose alone, and combinations of the two as indicated in Table III. The viscosities of these emulsion paints were determined at intervals on a Stormer viscosimeter after aging at room temperature and at 140° F. The data are given in Table III:

Table III.—Viscosity of polybutadiene emulsion paints

| Paint | Percent Protective Colloid in Paint Formulation | | Viscosity of Paint (Krebs Units) | | | | | |
| --- | --- | --- | --- | --- | --- | --- | --- | --- |
|  | Alpha Protein | Methyl[1] Cellulose | Initial | R. T. Aging | | | 140° F. Aging | |
|  |  |  |  | 1 Day | 1 Wk. | 4 Wks. | 1 Wk. | 4 Wks. |
| 1 | 2.2 | 0 | 57 | 57 | 56 | 56 | 56 | 56. |
| 2 | 2.1 | 0.2 | 60 | 61 | 61 |  | 59 |  |
| 3 | 1.8 | 0.4 | 69 | 70 | 70 | 69 | 68 | 68. |
| 4 | 0 | 1.0 | 102 | 102 | 112 | Paste | 113 | Paste. |
| Spred Satin Control |  |  | 60 | 60 | 60 | 60 | 59 |  |

[1] Methocel (100 cps.).

From the above data it is clear that the present invention affords a means for preparing a polybutadiene latex emulsion paint which is equivalent to a commercial butadiene-styrene copolymer latex emulsion paint in viscosity stability, gloss, hiding power, and leveling and which is superior in color stability, hardness after seven days' aging, washability, flexibility, adhesion, and resistance to staining.

The nature of the present invention having been thus fully set forth and specific examples of the same given, what is claimed as new and useful and desired to be secured by Letters Patent is:

1. A polybutadiene emulsion latex paint comprising 35 to 60 parts of polybutadiene latex, 15 to 25 parts of a pigment, 1 to 3 parts of kaolin, 1 to 3 parts of alpha protein, 0.15 to 0.25 part of methyl cellulose, 0.01 to 0.03 part of a metallic drier and sufficient water to give a paint having a solids content between 35 and 60%.

2. A polybutadiene emulsion paint consisting of 35 to 60 parts of polybutadiene latex, the coagulated polymer of which has a Mooney viscosity greater than 80, 15 to 25 parts of titanium dioxide, 5 to 15 parts of lithopone, 1 to 3 parts of kaolin, 0.1 to 0.2 part of tetrasodium pyrophosphate, 1 to 3 parts of alpha protein, 0.15 to 0.25 part of methyl cellulose, 0.1 to 0.3 part of ammonium hydroxide, 0.3 to 0.4 part of sodium pentachlorophenate, 0.3 to 0.5 part of pine oil, 0.01 to 0.03 part of a metallic drier, and sufficient water to give a total solids content between 45 and 55%.

3. Composition according to claim 2 in which the metallic drier is cobalt drier.

4. A polybutadiene latex emulsion paint consisting of 18.58 weight per cent of titanium dioxide, 10.05 weight per cent of lithopone, 2.21 weight per cent of kaolin, 0.14 weight per cent of tetrasodium phosphate, 2.12 weight per cent of alpha protein, 0.19 weight per cent of methyl cellulose, 0.17 weight per cent of ammonium hydroxide, 0.33 weight per cent of sodium pentachlorophenate, 0.42 weight per cent of pine oil, 38.50 weight per cent of polybutadiene latex (43% solids), the coagulated polymer of which has a Mooney viscosity greater than 80, 27.27 weight per cent of water and 0.02 weight per cent of cobalt drier.

References Cited in the file of this patent

UNITED STATES PATENTS

| Number | Name | Date |
|---|---|---|
| 2,273,880 | Mitchell | Feb. 24, 1942 |
| 2,279,387 | Cheetham et al. | Apr. 14, 1942 |
| 2,401,666 | Schmidt | June 4, 1946 |
| 2,492,124 | Young et al. | Dec. 20, 1949 |
| 2,605,242 | Betts et al. | July 29, 1952 |

OTHER REFERENCES

Rinse, Paint Technology, February 1952, pp. 55 to 59 and 65.